(12) United States Patent
Fox

(10) Patent No.: US 12,460,480 B1
(45) Date of Patent: Nov. 4, 2025

(54) ONE-PIECE TRIPE-HOOK SUPPORT DEVICE FOR LADDER SIDE RAILS

(71) Applicant: Jerry Fox, Waxahachie, TX (US)

(72) Inventor: Jerry Fox, Waxahachie, TX (US)

( * ) Notice: Subject to any disclaimer, the term of this patent is extended or adjusted under 35 U.S.C. 154(b) by 0 days.

(21) Appl. No.: 19/228,013

(22) Filed: Jun. 4, 2025

(51) Int. Cl.
*E06C 7/14* (2006.01)
*F16M 13/02* (2006.01)

(52) U.S. Cl.
CPC ............. *E06C 7/14* (2013.01); *F16M 13/022* (2013.01)

(58) Field of Classification Search
CPC ................................ F06C 7/14; F16M 13/022
USPC .................. 248/211, 304, 339, 340; 182/129
See application file for complete search history.

(56) References Cited

U.S. PATENT DOCUMENTS

| | | | |
|---|---|---|---|
| 3,661,351 A | 5/1972 | Olsen | |
| 3,964,711 A * | 6/1976 | Lund | E06C 7/14 248/210 |
| 4,624,430 A | 11/1986 | Ehmke | |
| 5,154,383 A * | 10/1992 | Collinson | E06C 7/14 248/211 |
| 5,226,623 A | 7/1993 | Hunt et al. | |
| 5,738,313 A * | 4/1998 | Rinke | F16L 3/22 248/211 |
| 6,474,607 B1 * | 11/2002 | Wilson | E06C 7/143 248/211 |
| 7,422,183 B2 | 9/2008 | Monteleone et al. | |
| 7,789,358 B1 | 9/2010 | Adams | |
| 2014/0008503 A1 | 1/2014 | Sweeney et al. | |

* cited by examiner

*Primary Examiner* — Todd M Epps
(74) *Attorney, Agent, or Firm* — Lanier, Ford, Shaver & Payne, PC; Gerald M. Walsh

(57) ABSTRACT

A hook support device having a longitudinal plate with a top surface, a front side, a first end, and a second end opposite the first end. The first end has a first hook, the second end has a second hook, and the front side has a third hook. The top surface of the longitudinal plate is constructed to contact an outer surface of a side rail of a ladder. The first hook and second hook are mounted on the outer surface of the side rail. The third hook is constructed to simultaneously i) contact a front surface of the side rail, ii) hook the hook support device to the front surface and outer surface, and iii) prevent the hook support device from sliding down the side rail. The hooks do not interfere with the use of the steps or rungs of the ladder.

15 Claims, 6 Drawing Sheets

ONE-PIECE TRIPE-HOOK SUPPORT DEVICE FOR LADDER SIDE RAILS

FIELD OF THE DISCLOSURE

This disclosure relates to hook devices attachable to ladders for suspending buckets, tools, and the like from ladders and, more particularly, to a one-piece triple hook support device that attaches to side rails of a ladder and suspends buckets, tools, and the like from the side rails of the ladder.

BACKGROUND OF THE DISCLOSURE

Many inventions are known which provide a hook on a ladder to hang a can or other articles therefrom. Some devices include a tray or platform for supporting a paint can or a hook member for suspending a paint container from a ladder rung. Attaching these devices to a rung or step of a ladder limits the use of the rung or step for moving up and down the ladder. In many cases it would be desirable to suspend buckets and tools from the side rail of the ladder.

U.S. Pat. No. 3,661,351 discloses a one-piece device that hooks to a ladder side rail and has at its opposite end a complex design for insertion into a paint bucket to suspend the paint bucket. This device does not provide a means for suspending the paint bucket with a hook, which would be easier to use than inserting a device of complex design into the paint bucket. This one piece device appears to be useful only with paint buckets having a standard rim assembly.

U.S. Patent Application 20140008503 discloses a painting accessory support formed of a long rod with several segments. The rod has a hook at one end to hook around the rail of a ladder. At the opposite end of the rod is a rotatable link. A hook-like clip is attached to the rotatable link and is used to suspend a paint can from its handle. This invention appears to be unnecessarily complex and unwieldly.

What is needed is a one-piece hook support device that has no moving parts and that hooks to a side rail of a ladder, hooks on to tools and buckets and the like, and can be used on a right side rail and on a left side rail of a ladder.

SUMMARY OF THE DISCLOSURE

This disclosure provides a hook support device having a longitudinal plate that has a top surface, a bottom surface, a front side, a rear side, a first end, and a second end opposite the first end. The first end has a first hook, the second end has a second hook, and the front side of the longitudinal plate has a third hook. The top surface of the longitudinal plate is constructed to contact an outer surface a side rail of a ladder and the third hook is constructed to simultaneously i) contact a front surface of the side rail, ii) hook the hook support device to the outer surface of the side rail and to the front surface of the side rail, and iii) prevent the hook support device from sliding down the side rail.

The first hook extends downward from the first end of the longitudinal plate and the second hook extends downward from the second end of the longitudinal plate and the third hook extends upward from the front side of the longitudinal plate. The first hook is constructed to suspend an article down an outer surface of a right side rail of a ladder and the second hook is constructed to suspend an article down a left side rail of the ladder.

The first hook has a hook tip and the second hook has a hook tip wherein the hook tip of the first hook extends from the first hook towards the center of the hook support and the hook tip of the second hook extends from the second hook towards the center of the hook support device. The hook tips of the first hook and of the second hook are constructed to prevent a suspended article from falling off the first hook and the second hook, respectively.

The third hook has a hook tip wherein the hook tip of the third hook extends from the third hook at an angle less than 90 degrees (preferably 35-55 degrees, preferably 45 degrees) and then extends further from the third hook at an angle of 72 degrees to 108 degrees, preferably 90 degrees, towards the rear side of the longitudinal plate.

The hook tip of the third hook contacts and wraps around an inner edge of the side rail wherein the hook tip of the third hook is constructed to extend into an interior of the side rail and wherein the hook tip of the third hook is constructed to contact a step (rung) of the ladder.

An advantage of the hook support device of this disclosure is that the hook support device is relatively small and compact yet can suspend up to at least thirty pounds of weight from its hook.

Another advantage is that the hooks for suspending articles are mounted on the side of a ladder and do not interfere with the use of the steps or rungs of the ladder.

Another advantage is that the hook support device is easy to attach and remove from a side rail by simple rotation of the hook support device around the front edge of the side rail.

Another advantage, because of the hook support device's small size, is that several of the hook support devices can be applied to both the left side rail and the right side rail at desired locations along the side rails if needed.

Another advantage is that the hook support device is relatively easy and inexpensive to manufacture.

DETAILED DESCRIPTION OF THE DISCLOSURE

While the following description details certain embodiments of a hook support device for ladder side rails, it is to be understood that the disclosure is not limited in its application to the description of the hook support device, since the hook support device of this disclosure is capable of other embodiments and of being practiced in various ways.

Figure 1:
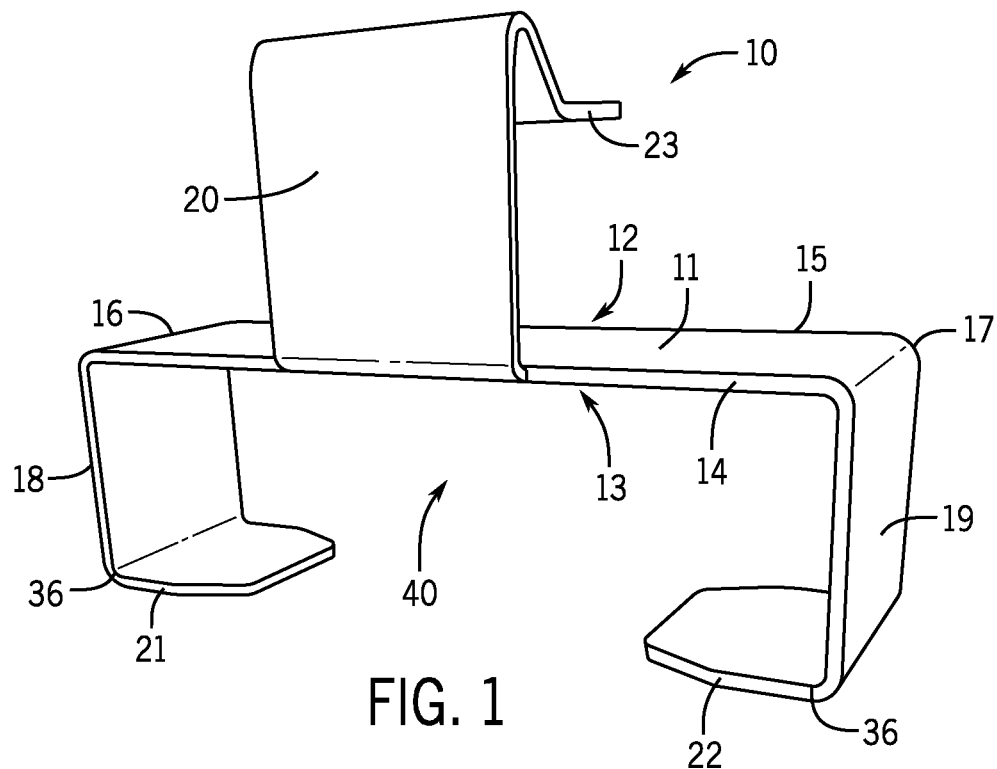
FIG. 1 shows a front perspective view of the hook support device of this disclosure.

FIG. 1 shows a front perspective view of the one-piece triple hook support device 10 of this disclosure. The hook support device 10 is formed of a longitudinal plate 11 which has a top surface 12, a bottom surface 13, a front side 14, and rear side 15, a first end 16 and a second end 17 opposite the first end 16. The first end 16 has a first hook 18 that extends downward and the second end 17 has a second hook 19 that extends downward. A third hook 20 is attached to the front end 14 of the longitudinal plate 11 and extends upward. The first hook 18 and the second hook 19 has a hook tip 22. The third hook 20 has a hook tip 23. The hook tip 21 extends from the first hook 18, towards the center of the hook support device 10, at an angle of 72 degrees to 108 degrees, preferably 90 degrees. The hook tip 22 extends from the second hook 19, towards the center of the hook support device 10, at an angle of 72 degrees to 108 degrees, preferably 90 degrees. The hook tip 21 and the hook tip 22 extend inward towards each other and define an interior area 40 of the hook support device 10. The hook tips 21 and 22 are constructed to prevent a suspended article from falling off the hooks 18 and 19, respectively.

Figure 2:
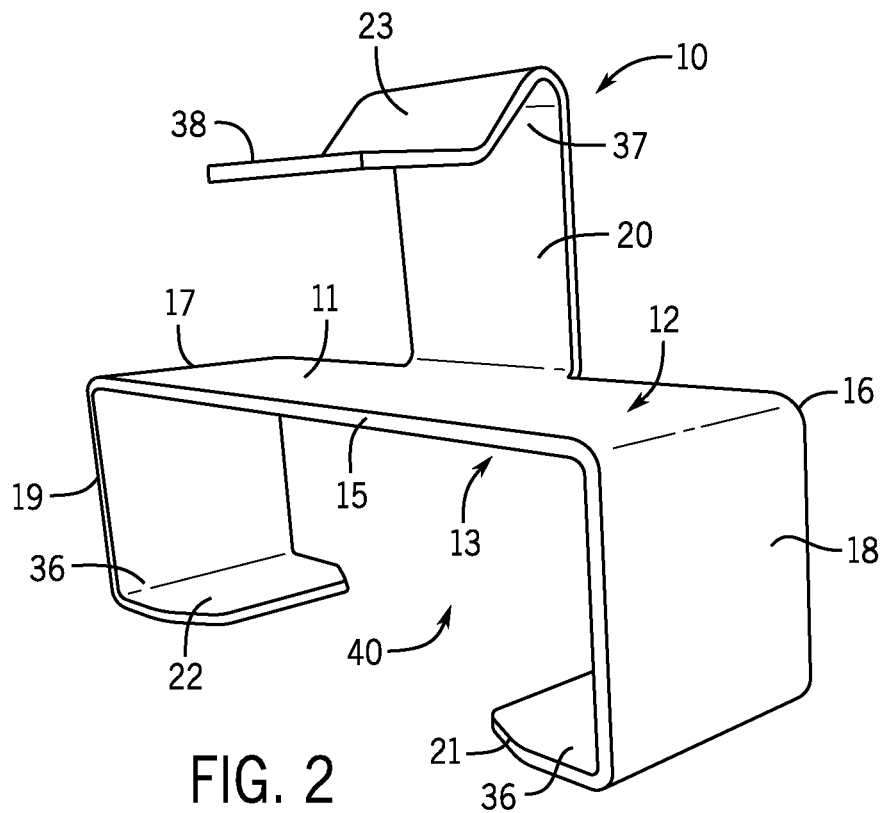
FIG. 2 shows a rear perspective view of the hook support device.
Figure 3:
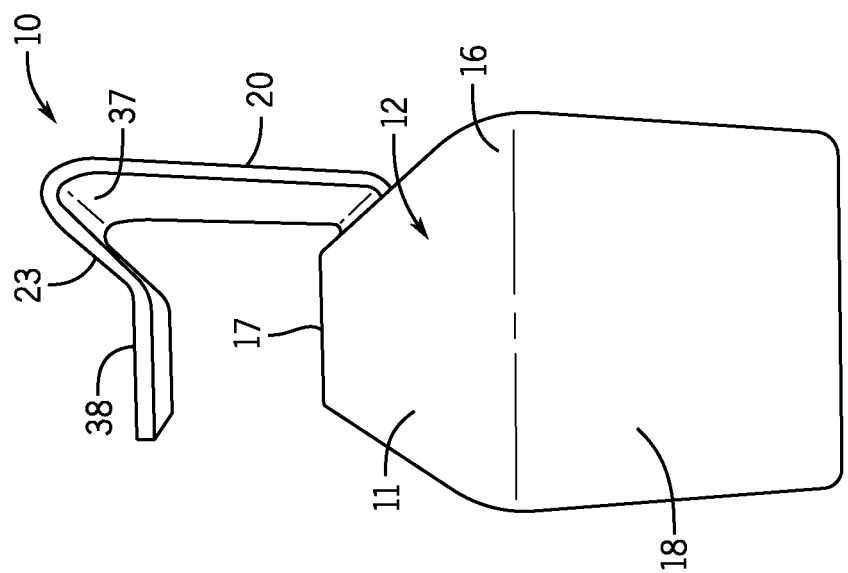
FIG. 3 shows a side perspective view of the hook support device.

FIG. 2 shows a rear perspective view of the hook support device 10. FIG. 2 further shows that the hook tip 23 of the third hook 20 extends from the third hook 20 at an angle less than 90 degrees (preferably 35-55 degrees, preferably 45 degrees) and then extends further from the third hook 20 at an angle of 72 degrees to 108 degrees, preferably 90 degrees, towards the rear side 15 of the longitudinal plate 11. FIG. 3 shows a first side 16 perspective view of the one-piece triple hook support device 10.

Figure 4:
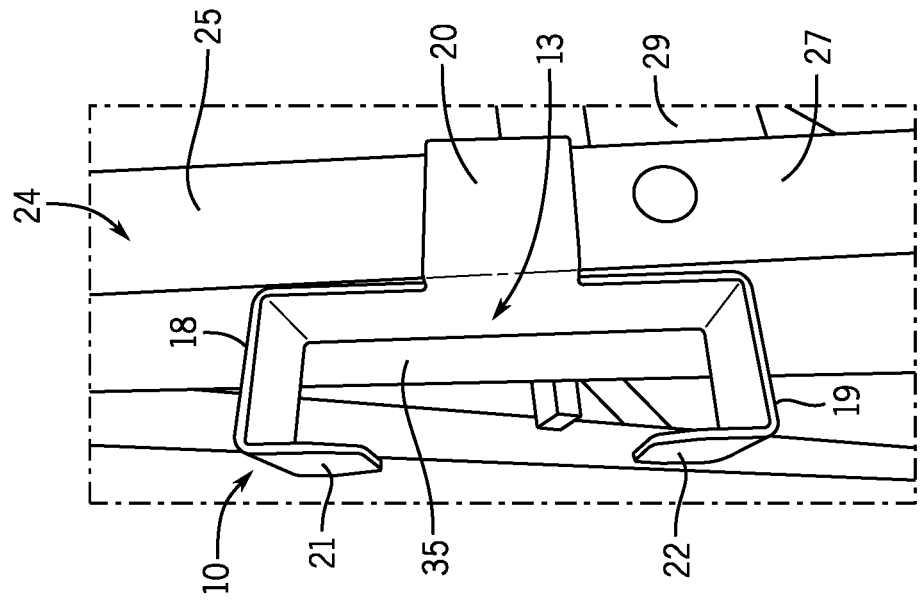
FIG. 4 shows a front perspective view of the hook support device attached to an outer surface of a left side rail of a ladder.
Figure 6:
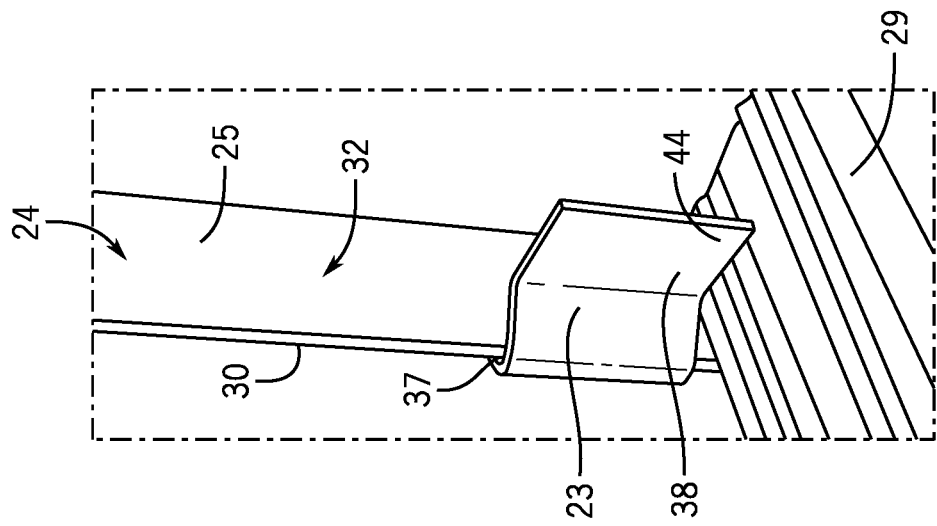
FIG. 6 shows a rear perspective view of the third hook of the hook support device extending into an interior of the left side rail.
Figure 5:
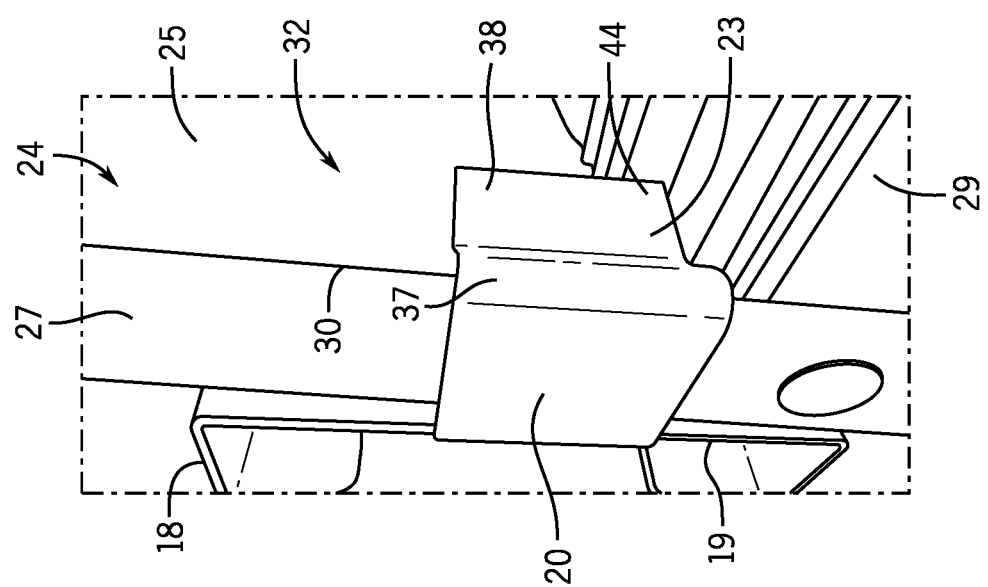
FIG. 5 shows a side perspective view of the third hook of the hook support device engaging the inner edge and front surface of the left side rail.

FIG. 4 shows a front perspective view of the hook support device 10 attached to an outer surface 35 of a left side rail 25 of a ladder 24. The hook 20 is attached to a front surface of the left side rail 25. FIG. 5 shows the third hook 20 of the hook support device 10 contacting the front surface 27 of the left side rail 25, and shows an inner edge 30 of the front surface 27 of the left side rail 25. The hook tip 23 of the third hook 20 engages and wraps around the inner edge 30 of the left side rail 25. The third hook tip 23 extends into an interior 32 of the left side rail 25. At least a portion 44 of the third hook tip 23 engages the step 29 (or rung) of the ladder and prevents the hook support device 10 from sliding down the left side rail 25 of the ladder 24. FIG. 6 shows a rear view of the left side rail 25 showing the third hook 20 of the hook support device 10 extending into the interior 32 of the left side rail 25. FIG. 6 shows also shows at least a portion 44 of the third hook tip 23 contacting the step (or rung) 29 of the ladder 24 and preventing the hook support device 10 from sliding down the left side rail 25.

Figure 7A:
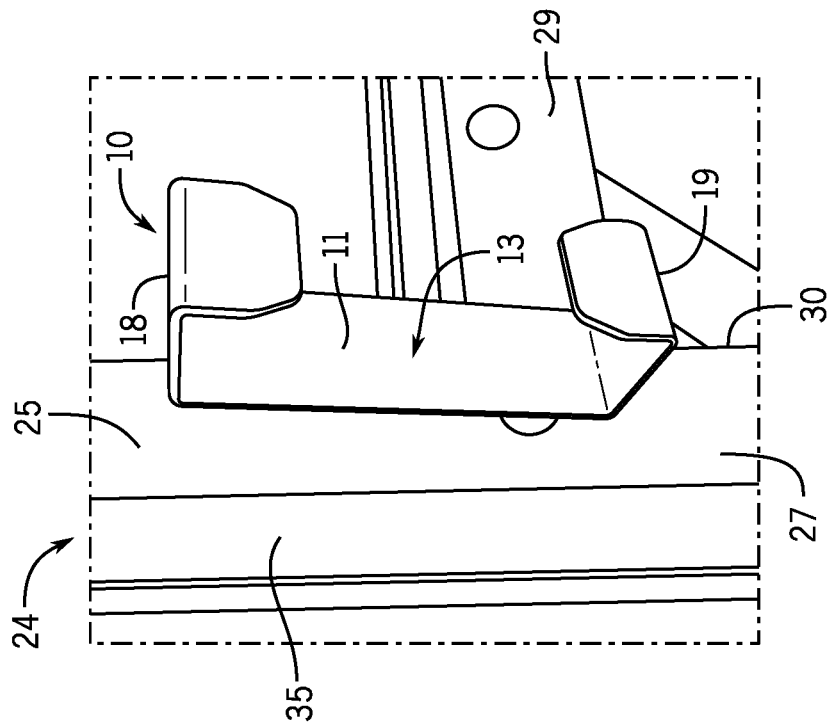
FIG. 7A shows the hook support device resting on a step of the ladder near the left side rail.
Figure 7B:
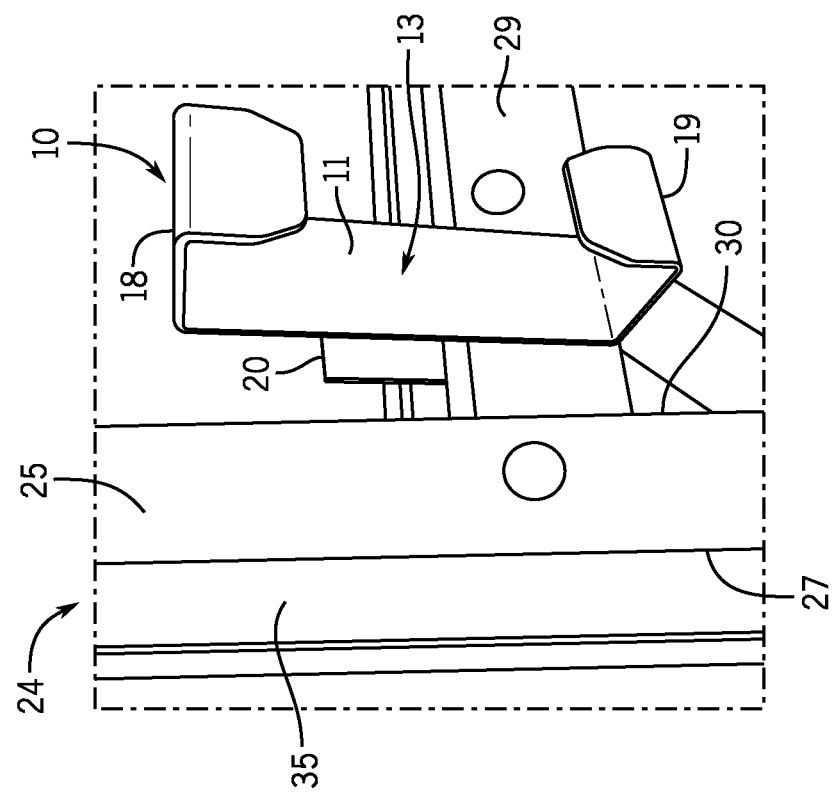
FIG. 7B shows the hook support device pushed towards the front of the left side rail so that the third hook enters an interior of the left side rail.
Figure 7D:
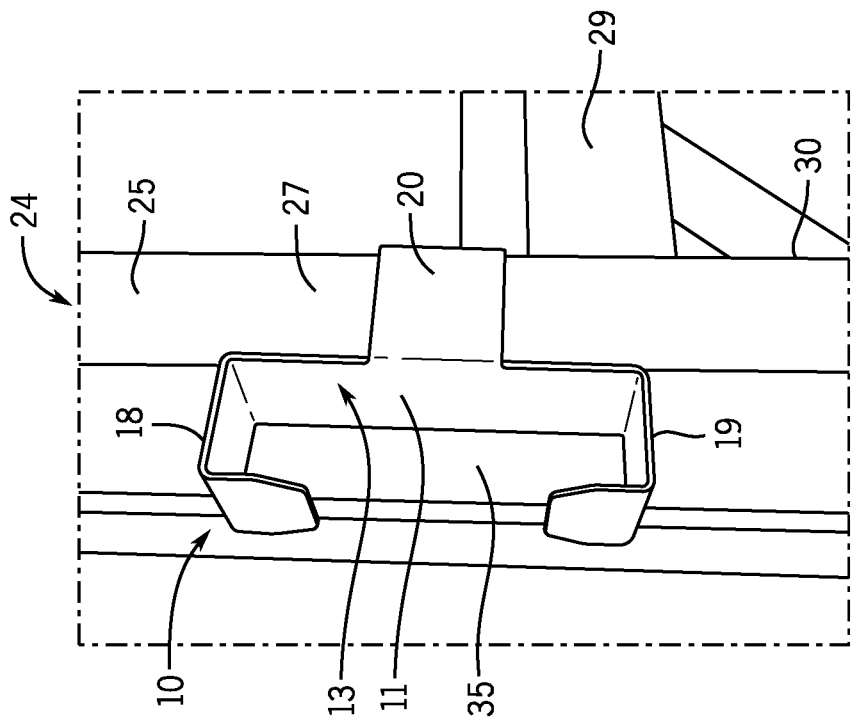
FIG. 7D shows the hook support device rotated further around the front of the left side rail so that the third hook engages the front of the left side rail and so that a longitudinal plate of the triple hook support device engages the outer surface of the left side rail.
Figure 7C:
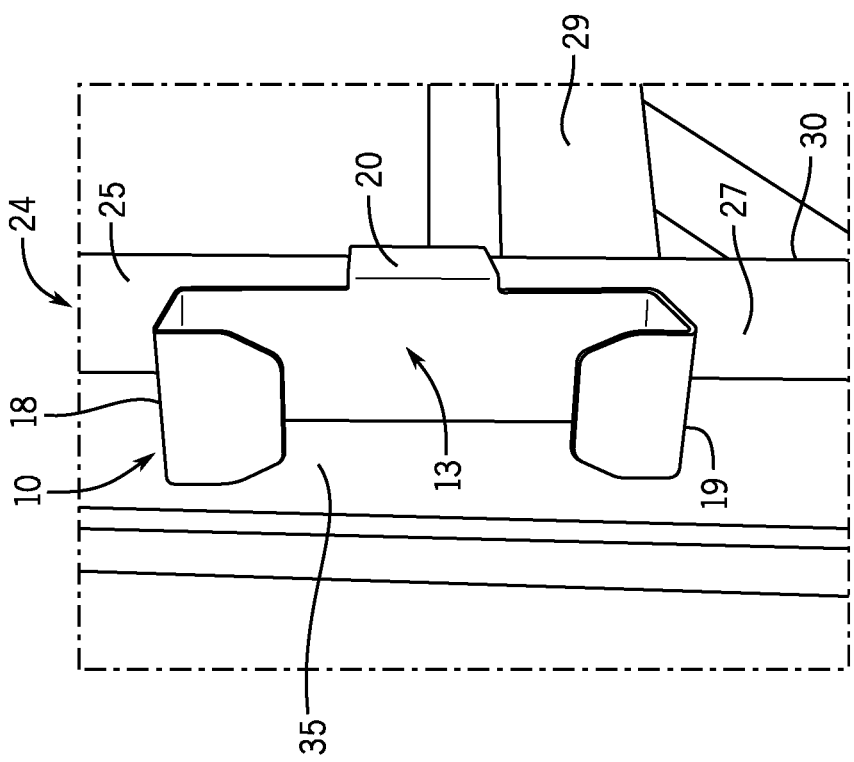
FIG. 7C shows the hook support device rotated around the front of the left side rail.

FIGS. 7A through 7D illustrate a method of attaching the hook support device 10 to the left side rail 25 of the ladder 24. In FIG. 7A the triple hook support device 10 is shown resting on a step 29 of the ladder 24 near the left side rail 25 by means of hook 20. FIG. 7B shows the hook support device 10 pushed towards the front surface 27 of the left side rail 25 so that the third hook tip 23 enters the interior 32 of the left side rail 25. FIG. 7C shows the hook support device 10 rotated around the inner edge 30 of the left side rail 25 and around the front surface 27 of the left side rail 25. FIG. 7D shows the hook support device 10 rotated further around the front surface 27 of the left side rail 25 so that the third hook 20 contacts the front surface 27 of the left side rail 25 and so that the longitudinal plate 11 of the hook support device 10 engages the outer surface 35 of the left side rail 25.

Figure 8:
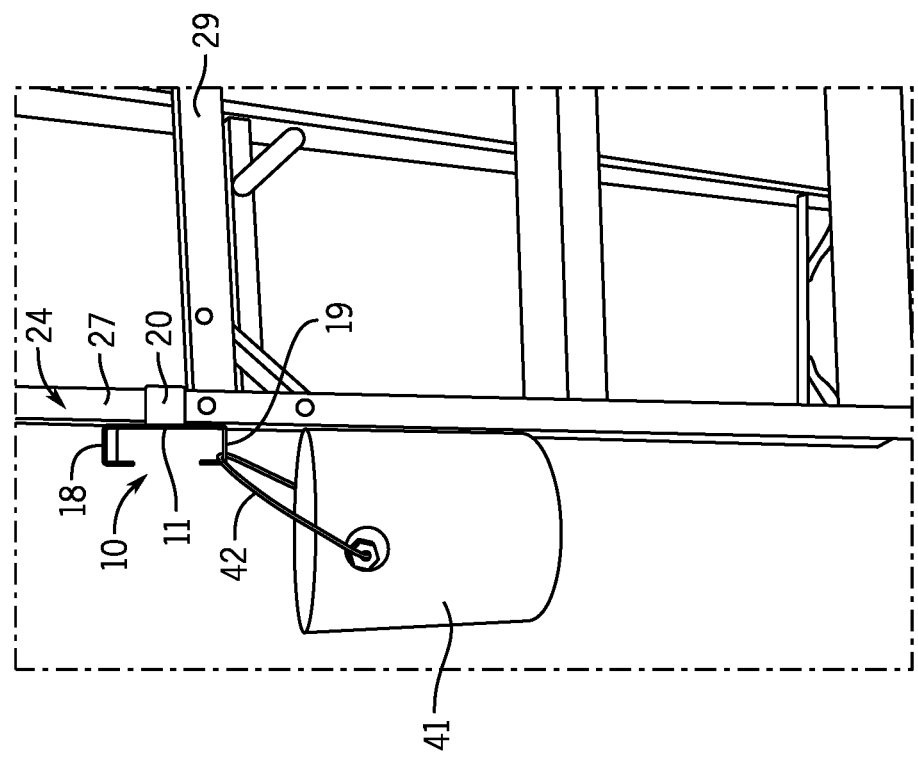
FIG. 8 shows a front view of a ladder with the hook support device attached to the left side rail of a ladder and suspending a paint bucket from the lower hook of the hook support device.

FIG. 8 shows a front view of the ladder 24 with the hook support device 10 attached to the left side rail 25 of the ladder 24 and suspending a paint bucket 41, for example, from the second hook 19 (lower hook) of the hook support device 10.

Figure 9:
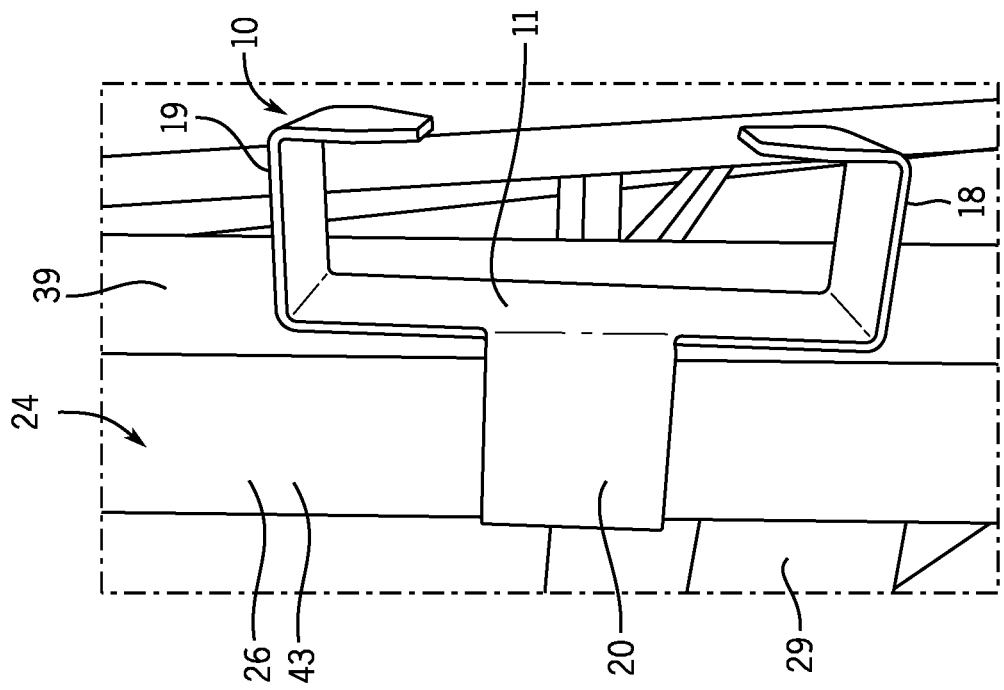
FIG. 9 shows a front perspective view of the hook support device attached to an outer surface of a right side rail of the ladder.

FIG. 9 shows a front perspective view of the hook support device 10 attached to an outer surface 39 of a right side rail 26 of ladder 24. The hook support device 10 attaches to the right side rail 26 in the same way as it attaches to the left side rail 25 except the hook support device 10 is inverted so that the lower hook from which an article is suspended is the first hook 18.

The hook support device 10 is preferably rigid and made of metal but can be made of any suitable plastic. The longitudinal plate is 2.8 to 4.2 inches in length, preferably 3.5 inches in length. The hooks 18 and 19 are 0.8 to 1.2 inches in length, preferably 1.0 inches. The hook tips 21 and 22 are 0.6 to 0.9 inches in length, preferably 0.75 inches in length. These parts are 0.8 to 1.2 inches wide, preferably 1 inch wide, and 0.05 to 0.0186 inches thick, preferably 0.0125 inches thick. Hook 20 is 1-1.5 inches in length, preferably 1.25 inches in length. The hook tip 23 is 0.8 to 1.2 inches in length, preferably 1 inch in length. These parts are 0.9 to 1.35 inches wide, preferably 1.125 inches wide, and 0.05 to 0.0186 inches thick, preferably 0.0125 inches thick.

The foregoing description illustrates and describes the hook support device of the disclosure. Additionally, the disclosure shows and describes only the preferred embodiments, but it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein are further intended to explain the best modes known by applicant and to enable others skilled in the art to utilize the hook support device in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A hook support device, comprising
   a) a longitudinal plate having a top surface, a bottom surface, a front side, a rear side, a first end, and a second end opposite the first end;
   b) the first end having a first hook, the second end having a second hook, and the front side of the longitudinal plate having a third hook; and c) the top surface of the longitudinal plate being constructed to contact an outer surface of a side rail of a ladder and the third hook being constructed to simultaneously i) contact a front surface of the side rail, ii) hook the hook support device to an outer surface of the side rail and to a front surface of the side rail, and iii) prevent the hook support device from sliding down the side rail.

2. The hook support device of claim 1, wherein the first hook is constructed to suspend an article from the outer surface of a right side rail and the second hook is constructed to suspend an article from the outer surface of a left side rail.

3. The hook support device of claim 1, wherein the first hook extends downward from the first end of the longitudinal plate and the second hook extends downward from the second end of the longitudinal plate and the third hook extends upward from the front side of the longitudinal plate.

4. The hook support device of claim 1, further comprising the first hook having a hook tip and the second hook having a hook tip, wherein the hook tip of the first hook extends from the first hook, towards the center of the hook support, and the hook tip of the second hook extends from the second hook, towards the center of the hook support device, and wherein the hook tips of the first hook and of the second hook are constructed to prevent a suspended article from falling off the first hook and the second hook, respectively.

5. The hook support device of claim 1, further comprising the third hook having a hook tip wherein the hook tip of the third hook extends from the third hook at an angle of 35-55 degrees, and then extends further from the third hook at an angle of 72 degrees to 108 degrees, towards the rear side of the longitudinal plate.

6. The hook support device of claim 5 wherein the hook tip of the third hook is constructed to contact and wrap around an inner edge of the side rail.

7. The hook support device of claim 5 wherein the hook tip of the third hook is constructed to extend into an interior of the side rail.

8. The hook support device of claim 5 wherein the hook tip of the third hook is constructed to contact a step of the ladder.

9. A hook support device, comprising
a) a longitudinal plate having a top surface, a bottom surface, a front side, and a rear side, a first end, and a second end opposite the first end;
b) the first end having a first hook, the second end having a second hook, and the front side of the longitudinal plate having a third hook;
c) the top surface of the longitudinal plate being constructed to contact an outer surface of a side rail of a ladder and the third hook being constructed to simultaneously i) contact a front surface of the side rail, ii) hook the hook support device to the outer surface of the side rail and to a front surface of the side rail, and iii) prevent the hook support device from sliding down the side rail; and
d) the third hook having a hook tip wherein the third hook extends upward from the front side of the longitudinal plate, wherein the hook tip of the third hook extends from the third hook at an angle less than 90 degrees (preferably 35-55 degrees, preferably 45 degrees) and then extends further from the third hook at an angle of 72 degrees to 108 degrees, preferably 90 degrees, towards the rear side of the longitudinal plate.

10. The hook support device of claim 9, wherein the first hook is constructed to suspend an article down an outer surface of a right side rail and the second hook is constructed to suspend an article down an outer surface of a left side rail.

11. The hook support device of claim 9, wherein the first hook extends downward from the first end of the longitudinal plate and the second hook extends downward from the second end of the longitudinal plate.

12. The hook support device of claim 9, further comprising the first hook having a hook tip and the second hook having a hook tip, wherein the hook tip of the first hook extends from the first hook, towards the center of the hook support, and the hook tip of the second hook extends from the second hook, towards the center of the hook support device, and wherein the hook tips of the first hook and of the second hook are constructed to prevent a suspended article from falling off the first hook and the second hook, respectively.

13. The hook support device of claim 9 wherein the hook tip of the third hook is constructed to contact and wrap around an inner edge of the ladder side rail.

14. The hook support device of claim 9 wherein the hook tip of the third hook is constructed to extend into an interior of the ladder side rail.

15. The hook support device of claim 9 wherein the hook tip of the third hook is constructed to contact a step of the ladder.

* * * * *